(12) United States Patent
Chavarria et al.

(10) Patent No.: US 9,245,277 B1
(45) Date of Patent: Jan. 26, 2016

(54) SYSTEMS AND METHODS FOR CATEGORIZING NEIGHBORHOODS BASED ON PAYMENT CARD TRANSACTIONS

(71) Applicant: MasterCard International Incorporated, Purchase, NY (US)

(72) Inventors: Pedro J. Chavarria, New York, NY (US); Kristofer Perez, New York, NY (US)

(73) Assignee: MasterCard International Incorporated, Purchase, NY (US)

( * ) Notice: Subject to any disclaimer, the term of this patent is extended or adjusted under 35 U.S.C. 154(b) by 0 days.

(21) Appl. No.: 14/324,471

(22) Filed: Jul. 7, 2014

(51) Int. Cl.
  *G06K 5/00* (2006.01)
  *G06Q 30/02* (2012.01)
  *G06Q 40/00* (2012.01)

(52) U.S. Cl.
  CPC ............ *G06Q 30/0205* (2013.01); *G06Q 40/12* (2013.12)

(58) Field of Classification Search
  CPC ......... G06K 5/00; G06K 19/00; G06K 13/24; G06K 19/06; G06F 17/00; G06F 19/00; G06Q 40/00; G07D 11/00
  USPC .......................... 235/380, 487, 379, 375, 492
  See application file for complete search history.

(56) References Cited

U.S. PATENT DOCUMENTS

| | | | | |
|---|---|---|---|---|
| 7,954,698 B1 * | 6/2011 | Pliha | ............................. | 235/379 |
| 2007/0262140 A1 * | 11/2007 | Long | ............................. | 235/380 |
| 2008/0133325 A1 * | 6/2008 | De et al. | ........................... | 705/10 |
| 2009/0018996 A1 | 1/2009 | Hunt et al. | | |
| 2009/0192875 A1 | 7/2009 | Bene et al. | | |
| 2009/0192876 A1 | 7/2009 | De et al. | | |
| 2009/0299820 A1 | 12/2009 | Wang et al. | | |
| 2010/0049538 A1 | 2/2010 | Frazer et al. | | |
| 2010/0306032 A1 | 12/2010 | Jolley | | |
| 2011/0246260 A1 | 10/2011 | Gilbert et al. | | |
| 2012/0066065 A1 * | 3/2012 | Switzer | ...................... | 705/14.53 |
| 2013/0102283 A1 * | 4/2013 | Lau | ........................ | H04W 12/06 455/411 |
| 2013/0124263 A1 | 5/2013 | Amaro et al. | | |
| 2014/0279411 A1 * | 9/2014 | Bertanzetti | ........ | G06Q 20/3224 705/39 |

* cited by examiner

*Primary Examiner* — Edwyn Labaze
(74) *Attorney, Agent, or Firm* — Armstrong Teasdale LLP

(57) ABSTRACT

A computer implemented method for categorizing neighborhoods based on cardholder transactions is provided. The method is implemented using a computing device having a processor communicatively coupled to a memory. The method includes receiving a plurality of payment transactions from a plurality of cardholders, generating a list of cardholders based on the plurality of payment transactions, determining one or more life stage segments for each cardholder based on the plurality of payment transactions, determining one or more geographic regions based in part on the plurality of payment transactions where each geographic region contains a plurality of cardholders, determining a lifestyle category for at least one geographic region of the one or more geographic regions based on the one or more life stage segments of each of the cardholders associated with the corresponding geographic region, and providing a lifestyle report for the at least one geographic region.

20 Claims, 7 Drawing Sheets

SYSTEMS AND METHODS FOR CATEGORIZING NEIGHBORHOODS BASED ON PAYMENT CARD TRANSACTIONS

BACKGROUND OF THE DISCLOSURE

The field of the disclosure relates generally to categorizing a neighborhood of persons, and more specifically to method and systems for modeling payment card transactions for a group of cardholders residing within a predefined neighborhood such that the neighborhood can be categorized within a life stage.

A life stage segment is a group of consumers who are classified based on shared demographics and/or certain differentiating spending behaviors. Determining the life stages of neighborhoods can be important. For example, realtors may like to know the demographics of a neighborhood to be able to point potential buyers to a desired neighborhood. Knowing the demographics also helps landlords and realtors to better direct their advertising materials. For example, if a potentially buyer has small children, then that buyer probably wants to be shown houses in neighborhoods with other families having small children.

Generally, people in different life stages have different spending behaviors. However, a lack of detailed consumer information coupled with an inability to access private information makes it difficult to determine the life stage of a neighborhood without thoroughly investigating that neighborhood. At least one result is that realtors and landlords waste resources on poorly targeted promotional campaigns. Further, potential buyers and renters may get frustrated with being directed to places to live that don't fit their life stage.

Realtors and landlords would like to focus their efforts more effectively to make their buyers and renters happy. In addition, it is desired that the categorizing of neighborhoods, apartment complexes, and/or apartment buildings, be accomplished without continuous gathering, storing, and updating of consumer data. A system that is configured to categorize a neighborhood with different life stages would help direct potential buyers and renters to places to live that are more relevant to them.

BRIEF DESCRIPTION OF THE DISCLOSURE

In one aspect, a computer implemented method for categorizing neighborhoods based on cardholder transactions is provided. The method is implemented using a computing device having a processor communicatively coupled to a memory. The method includes receiving by the processor a plurality of payment transactions from a plurality of cardholders, generating by the processor a list of cardholders based on the plurality of payment transactions, determining by the processor one or more life stage segments for each cardholder based on the plurality of payment transactions, determining by the processor one or more geographic regions based in part on the plurality of payment transactions where each geographic region contains a plurality of cardholders, determining by the processor a lifestyle category for at least one geographic region of the one or more geographic regions based on the one or more life stage segments of each of the cardholders associated with the corresponding geographic region, and providing by the processor a lifestyle report for the at least one geographic region.

In another aspect, a computer system for categorizing neighborhoods based on cardholder transactions is provided. The computer system includes a memory device for storing data and one or more processors in communication with the memory device. The one or more processors are programmed to receive a plurality of payment transactions from a plurality of cardholders, generate a list of cardholders based on the plurality of payment transactions, determine one or more life stage segments for each cardholder based on the plurality of payment transactions, determine one or more geographic regions based in part on the plurality of payment transactions where each geographic region contains a plurality of cardholders, determine a lifestyle category for at least one geographic region of the one or more geographic regions based on the one or more life stage segments of each of the cardholders associated with the corresponding geographic region, and provide a lifestyle report for the at least one geographic region.

In yet another aspect, a computer-readable storage medium having computer-executable instructions embodied thereon is provided. When executed by a computing device having at least one processor coupled to a memory device, the computer-executable instructions cause the processor to receive a plurality of payment transactions from a plurality of cardholders, generate a list of cardholders based on the plurality of payment transactions, determine at least one life stage segment for each cardholder based on the plurality of payment transactions, determine one or more geographic regions based in part on the plurality of payment transactions where each geographic region contains a plurality of cardholders, determine a lifestyle category for at least one geographic region of the one or more geographic regions based on the one or more life stage segments of each of the cardholders associated with the corresponding geographic region, and provide a lifestyle report for the at least one geographic region.

BRIEF DESCRIPTION OF THE DRAWINGS

FIG. 1 is a schematic diagram illustrating an example multi-party transaction card industry system for enabling ordinary payment-by-card transactions in which merchants and card issuers do not need to have a one-to-one special relationship.

FIG. 2 is a simplified block diagram of an example computer system used for determining the lifestyle categories of geographic regions in accordance with one example embodiment of the present disclosure.

FIG. 3 illustrates an example configuration of a client system shown in FIG. 2, in accordance with one embodiment of the present disclosure.

FIG. 4 illustrates an example configuration of the server system shown in FIG. 2, in accordance with one embodiment of the present disclosure.

FIG. 5 is a flowchart illustrating an example of the process of determining the lifestyle category of a geographic region from cardholder transaction using the system shown in FIG. 2, in accordance with one embodiment of the disclosure.

FIG. 6 is a flowchart illustrating an example of the process of determining one or more life stage segments for a cardholder using the system shown in FIG. 2, in accordance with one embodiment of the disclosure.

FIG. 7 is a diagram of components of one or more example computing devices that may be used in the system shown in FIG. 2.

DETAILED DESCRIPTION OF THE DISCLOSURE

Figure 1:
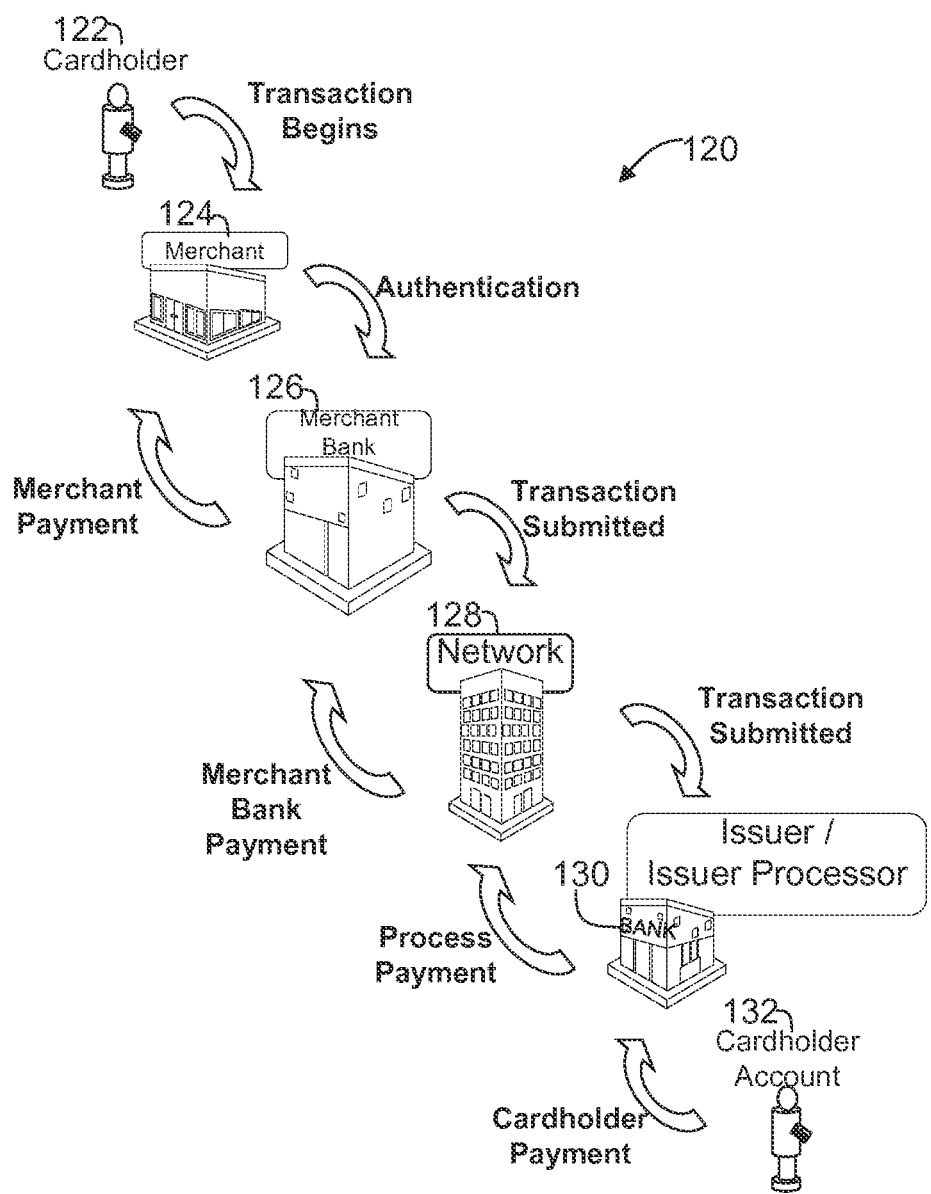
FIGS. 1-7 show example embodiments of the methods and systems described herein.

The following detailed description illustrates embodiments of the disclosure by way of example and not by way of limitation. The description clearly enables one skilled in the art to make and use the disclosure, describes several embodiments, adaptations, variations, alternatives, and uses of the disclosure, including what is presently believed to be the best mode of carrying out the disclosure. The disclosure is described as applied to an example embodiment, namely, methods and systems for providing cardholders the most traveled paths or routes taken by other cardholders. More specifically, the disclosure describes a lifestyle determining ("LD") computing device configured to collect transaction data for a plurality of payment cardholders transacting with a plurality of merchants, determine the life stage segment of multiple cardholders residing in a geographic region, determine a lifestyle category for the geographic region based on the cardholders residing in that geographic region, and generate a report for that geographic region.

In the example embodiment, the life stage segments and the lifestyle categories use the same categorizations which include, but are not limited to, singles, recent couples/recently married, new parents, parents with teenagers, and retirement. In other embodiments, the life stage segments and the lifestyle categories may use different categorizations. For example, the life stage segment may include gender, age group, profession type, marital status, and family status.

In the example embodiment, the LD computing device is configured for use with a payment card processing network such as, for example, an interchange network. The LD computing device includes a memory device and a processor in communication with the memory device and is programmed to communicate with the payment network to receive transaction information for a plurality of cardholders. The payment network is configured to process payment card transactions between the merchant and its acquirer bank, and the cardholder and their issuer bank. Transaction information includes data relating to purchases made by cardholders at various merchants during a predetermined time period, including at least a unique identifier for each cardholder, a merchant identifier, a merchant category, a geographic location of a merchant, a transaction amount, and a date and time for the transaction. In some embodiments, the plurality of purchases made by the cardholders are related to each other as being in the same market category, for example, but not limited to, a dining category, an events category, a night club category, or an activities category.

In the example embodiment, a payment card processing network receives a plurality of payment transactions for processing. The processing network stores these payment transactions in a database. The LD computing device is in communication with the payment network database. The LD computing device receives the transactions stored in the database. Each transaction includes at least a unique identifier for each cardholder, a merchant identifier, a merchant category, a geographic location of a merchant, a transaction amount, and a date and time for the transaction.

In the example embodiment, using the plurality of payment transactions, the LD computing device determines the cardholders that have completed at least one transaction during a predetermined time period. The LD computing device determines one or more life stage segment(s) for each cardholder. In the example embodiment, the LD computing device determines that the cardholder belongs to one life stage segment, such as, but not limited to, singles, recent couples/recently married, new parents, parents with teenagers, and retirement. In other embodiments, the LD computing device determines that the cardholder belongs to multiple life stage segments.

In the example embodiment, the LD computing device defines geographic regions based on the determined cardholder life segments and the received transaction data. A geographic region may be any geographic identifier including, for example and without limitation, a postal code, a city/town/municipality, a neighborhood in a city/town/municipality, GPS coordinates, a county, a single city block, an apartment complex, a street, a street address, and sub-divisions of any of the preceding geographic identifiers. In some embodiments, the geographic region may be predefined by the user or may be determined by the LD computing device. In either case, a minimum number of cardholders in the same life stage segment are required for a defined geographic region to ensure that no personally identifiable information may be obtained from the classification. In the example embodiment, at least three (3) cardholders in a life stage segment are needed to determine a geographic region. If it is determined that there is less than three (3) cardholders in a life stage segment of a geographic region, then the system or the user must re-define a larger geographic region.

To define a geographic region, the LD computing device identifies a minimum number of cardholders with the same life stage segment living in close proximity. For example, in some places with high population density, e.g., New York City, the LD computing device identifies seven cardholders living in the same apartment building. The LD computing device identifies three of those cardholders to be in the "new parents" life stage segment, three of them in the "retired" life stage segment, and one cardholder in the "singles" life stage segment. Because there is only one cardholder in the "singles" life stage segment, which is below the required minimum number for a geographic region, the LD computing device expands the geographic region until the number of cardholders in each life stage segment with at least one cardholder exceeds the minimum. In the example embodiment, the LD computing device ignores life stage segments with zero cardholders. In the above example, the LD computing device expands the proposed geographic region to include a neighboring building which may add 2 "new parents", 1 "retired", and 3 "singles" cardholders. Since no life stage segment with cardholders is below the minimum, the LD computing device defines those two buildings as one geographic region. If the second building had added a single cardholder in a different life stage segment, then the LD computing device would expand the proposed geographic region again. In other places with lower population density, e.g., rural or suburban cardholders may be more spread out and the LD computing device may only be able to find three cardholders of the same life stage segment on a street or a block, rather than an apartment building and define the geographic region to be that street or block.

For each geographic region, the LD computing device determines a lifestyle category for the geographic region based on the life stage segments of the cardholders associated with that geographic region. In some embodiments, the LD computing device may determine a lifestyle category for a geographic region based on the life stage segment with the most cardholders in that geographic region. For example, a majority or more, such as 7 of the 10 cardholders in a geographic region are in the "new parents" life stage segment, then the LD computing device determines that the geographic region is in the "new parents" lifestyle category. However, there may not be a majority of cardholders in one life stage segment, therefore in other embodiments, the LD computing device may determine a lifestyle category for a geographic region based on percentages (i.e., the lifestyle category is determined based on the life stage segment with the highest percentage of cardholders) or calculated formulas (e.g., if the total number of cardholders with a particular life stage segment exceeds a predetermined threshold). In the example embodiment, the lifestyle categories are the same as the life stage segments, in other embodiments, multiple life stage segments may be combined to determine the lifestyle category. In some embodiments, the lifestyle category is further broken down into sub-categories, such as multiple children and single child. In some embodiments, a minimum number of cardholders must reside in a geographic region to determine a lifestyle category for the geographic region.

The LD computing device generates a lifestyle report for each determined geographic region. In some embodiments, the lifestyle report is a numerical report, showing the numbers of cardholders belonging to different life stage segments, living in the geographic region. In other embodiments, the lifestyle report may graphically represent the lifestyle categories with different colors representing different lifestyle categories in one or more geographic regions. The lifestyle report may be displayed as an overlay of a geographic map. In further embodiments, the lifestyle report includes the different life stage segments of the different cardholders in the geographic region.

In the some embodiments, the LD computing device determines the life stage segments associated with a cardholder by analyzing the transactions that the cardholder made. The LD computing device first analyzes a transaction that a cardholder performed and determines a score profile to assign to that transaction. The score profile includes one or more probability adjustments for one or more life stage segments. In the example embodiment, the LD computing device assigns the score profile based on the merchant category of the transaction. In some embodiments, merchants have associated scoring profiles based on the merchant category, e.g., the scoring profile for a retail toy store is different than the scoring profile for a high-end men's clothing store. In other embodiments, the scoring profile is associated with an individual store. Based on the scoring profile of the merchant, the LD computing device calculates the cardholder's life stage segment probabilities based on the score profile and any previously calculated life stage segment probabilities. The life stage segment probabilities are a collection of probabilities that the cardholder belongs to one or more life stage segments, where each probability is associated with a life stage segment. For example, if the cardholder makes a purchase from a retail toy store, then the LD computing device increases the probability associated with the cardholder being in the "new parents" and the "parents with teenagers" life stage segments.

The LD computing device checks to see if there are more transactions to analyze for this cardholder. If there are more transactions, then the LD computing device analyzes the next transaction. If there are no more transactions, then the LD computing device generates one or more groups of transactions. For example, the LD computing device may generate a group of all of the transactions at grocery stores, a group of all of the home improvement store transactions, and a further group of all of the high-end clothing store transactions. For each group of transactions, the LD computing device determines a score profile to assign to the group. For example, the LD computing device analyzes the group of cardholder transactions at home-improvement stores. In the analysis, the LD computing device determines that there are a significant number of moderately-sized transactions during the weekends and assigns the score profile of a new home owner. In another example, the LD computing device determines that there are a significant number of large purchases that primarily occur on weekdays, then the LD computing device assigns the score profile of a contractor.

Once the score profiles are assigned to the groups, the LD computing device calculates the life stage segment probabilities for the cardholder based on the assigned score profiles and any previously calculated life stage segment probabilities. The LD computing device determines one or more life stage segments to assign to the cardholder based on the probabilities. In some embodiments, the LD computing device determines the one or more life stage segments based on the probabilities exceeding predetermined thresholds. In other embodiments, the LD computing device combines multiple probabilities to determine a life stage segment.

In some embodiments, cardholder profiles are stored without including sensitive personal information, also known as personally identifiable information or PII, in order to ensure the privacy of individuals associated with the stored data. Personally identifiable information may include any information capable of identifying an individual. For privacy and security reasons, personally identifiable information may be withheld from the cardholder profiles. In some examples where privacy and security can otherwise be ensured, or where individuals consent, personally identifiable information may be retained in the cardholder profiles. In such examples, personally identifiable information may be needed to create enhanced financial assessments. In situations in which the systems discussed herein collect personal information about individuals including cardholders or merchants, or may make use of such personal information, the individuals may be provided with an opportunity to control whether such information is collected or to control whether and/or how such information is used. In addition, certain data may be processed in one or more ways before it is stored or used, so that personally identifiable information is removed. For example, an individual's identity may be processed so that no personally identifiable information can be determined for the individual, or an individual's geographic location may be generalized where location data is obtained (such as to a city, ZIP code, or state level), so that a particular location of an individual cannot be determined. Thus, the individual may have control over how information is collected about the individual and used by systems including the LD computing device.

The methods and systems described herein may be implemented using computer programming or engineering techniques including computer software, firmware, hardware, or any combination or subset wherein a technical effect of the systems and processes described herein is achieved by performing at least one of the following steps: (a) receiving a plurality of payment transactions from a plurality of cardholders; (b) generating a list of cardholders based on the plurality of payment transactions; (c) determining at least one life stage segment for each cardholder based on the plurality of payment transactions; (d) determining an inferred geographic region associated with each cardholder based on the plurality of payment transactions; (e) determining a lifestyle category for at least one inferred geographic region based on the at least one life stage segments of each of the cardholders associated with the corresponding inferred geographic region; and (f) providing, by the processor, a lifestyle report for the at least one geographic region.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a prepaid card, a gift card, and/or any other device that may hold payment account information, such as mobile phones, Smartphones, personal digital assistants (PDAs), key fobs, and/or computers. Each type of transactions card can be used as a method of payment for performing a transaction.

In one embodiment, a computer program is provided, and the program is embodied on a computer readable medium. In an example embodiment, the system is executed on a single computer system, without requiring a connection to a server computer. In a further example embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). In a further embodiment, the system is run on an iOS® environment (iOS is a registered trademark of Cisco Systems, Inc. located in San Jose, Calif.). In yet a further embodiment, the system is run on a Mac OS® environment (Mac OS is a registered trademark of Apple Inc. located in Cupertino, Calif.). The application is flexible and designed to run in various different environments without compromising any major functionality. In some embodiments, the system includes multiple components distributed among a plurality of computing devices. One or more components are in the form of computer-executable instructions embodied in a computer-readable medium. The systems and processes are not limited to the specific embodiments described herein. In addition, components of each system and each process can be practiced independently and separately from other components and processes described herein. Each component and process can also be used in combination with other assembly packages and processes.

In one embodiment, a computer program is provided, and the program is embodied on a computer readable medium and utilizes a Structured Query Language (SQL) with a client user interface front-end for administration and a web interface for standard user input and reports. In another embodiment, the system is web enabled and is run on a business-entity intranet. In yet another embodiment, the system is fully accessed by individuals having an authorized access outside the firewall of the business-entity through the Internet. In a further embodiment, the system is being run in a Windows® environment (Windows is a registered trademark of Microsoft Corporation, Redmond, Wash.). The application is flexible and designed to run in various different environments without compromising any major functionality.

As used herein, an element or step recited in the singular and preceded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the term "database" may refer to either a body of data, a relational database management system (RDBMS), or to both. A database may include any collection of data including hierarchical databases, relational databases, flat file databases, object-relational databases, object oriented databases, and any other structured collection of records or data that is stored in a computer system. The above examples are for example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

The term processor, as used herein, may refer to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are for example only, and are thus not limiting as to the types of memory usable for storage of a computer program.

FIG. 1 is a schematic diagram illustrating an example multi-party transaction card industry system 120 for enabling ordinary payment-by-card transactions in which merchants 124 and card issuers 130 do not need to have a one-to-one special relationship. Embodiments described herein may relate to a transaction card system, such as a credit card payment system using the MasterCard® interchange network. The MasterCard® interchange network is a set of proprietary communications standards promulgated by MasterCard International Incorporated® for the exchange of financial transaction data and the settlement of funds between financial institutions that are members of MasterCard International Incorporated®. (MasterCard is a registered trademark of MasterCard International Incorporated located in Purchase, N.Y.).

In a typical transaction card system, a financial institution called the "issuer" issues a transaction card, such as a credit card, to a consumer or cardholder 122, who uses the transaction card to tender payment for a purchase from a merchant 124. To accept payment with the transaction card, merchant 124 must normally establish an account with a financial institution that is part of the financial payment system. This financial institution is usually called the "merchant bank," the "acquiring bank," or the "acquirer." When cardholder 122 tenders payment for a purchase with a transaction card, merchant 124 requests authorization from a merchant bank 126 for the amount of the purchase. The request may be performed over the telephone, but is usually performed through the use of a point-of-sale terminal, which reads cardholder's 122 account information from a magnetic stripe, a chip, or embossed characters on the transaction card and communicates electronically with the transaction processing computers of merchant bank 126. Alternatively, merchant bank 126 may authorize a third party to perform transaction processing on its behalf. In this case, the point-of-sale terminal will be configured to communicate with the third party. Such a third party is usually called a "merchant processor," an "acquiring processor," or a "third party processor."

Using an interchange network 128, computers of merchant bank 126 or merchant processor will communicate with computers of an issuer bank 130 to determine whether cardholder's 122 account 132 is in good standing and whether the purchase is covered by cardholder's 122 available credit line. Based on these determinations, the request for authorization will be declined or accepted. If the request is accepted, an authorization code is issued to merchant 124.

When a request for authorization is accepted, the available credit line of cardholder's 122 account 132 is decreased. Normally, a charge for a payment card transaction is not posted immediately to cardholder's 122 account 132 because bankcard associations, such as MasterCard International Incorporated®, have promulgated rules that do not allow merchant 124 to charge, or "capture," a transaction until goods are shipped or services are delivered. However, with respect to at least some debit card transactions, a charge may be posted at the time of the transaction. When merchant 124 ships or delivers the goods or services, merchant 124 captures the transaction by, for example, appropriate data entry procedures on the point-of-sale terminal. This may include bundling of approved transactions daily for standard retail purchases. If cardholder 122 cancels a transaction before it is captured, a "void" is generated. If cardholder 122 returns goods after the transaction has been captured, a "credit" is generated. Interchange network 128 and/or issuer bank 130 stores the transaction card information, such as a category of merchant, a merchant identifier, a location where the transaction was completed, amount of purchase, date and time of transaction, in a database 220 (shown in FIG. 2).

After a purchase has been made, a clearing process occurs to transfer additional transaction data related to the purchase among the parties to the transaction, such as merchant bank 126, interchange network 128, and issuer bank 130. More specifically, during and/or after the clearing process, additional data, such as a time of purchase, a merchant name, a type of merchant, purchase information, cardholder account information, a type of transaction, itinerary information, information regarding the purchased item and/or service, and/or other suitable information, is associated with a transaction and transmitted between parties to the transaction as transaction data, and may be stored by any of the parties to the transaction. In the exemplary embodiment, when cardholder 122 purchases travel, such as airfare, a hotel stay, and/or a rental car, at least partial itinerary information is transmitted during the clearance process as transaction data. When interchange network 128 receives the itinerary information, interchange network 128 routes the itinerary information to database 220.

For debit card transactions, when a request for a personal identification number (PIN) authorization is approved by the issuer, cardholder's account 132 is decreased. Normally, a charge is posted immediately to cardholder's account 132. The payment card association then transmits the approval to the acquiring processor for distribution of goods/services or information, or cash in the case of an automated teller machine (ATM).

After a transaction is authorized and cleared, the transaction is settled among merchant 124, merchant bank 126, and issuer bank 130. Settlement refers to the transfer of financial data or funds among merchant's 124 account, merchant bank 126, and issuer bank 130 related to the transaction. Usually, transactions are captured and accumulated into a "batch," which is settled as a group. More specifically, a transaction is typically settled between issuer bank 130 and interchange network 128, and then between interchange network 128 and merchant bank 126, and then between merchant bank 126 and merchant 124.

Figure 2:
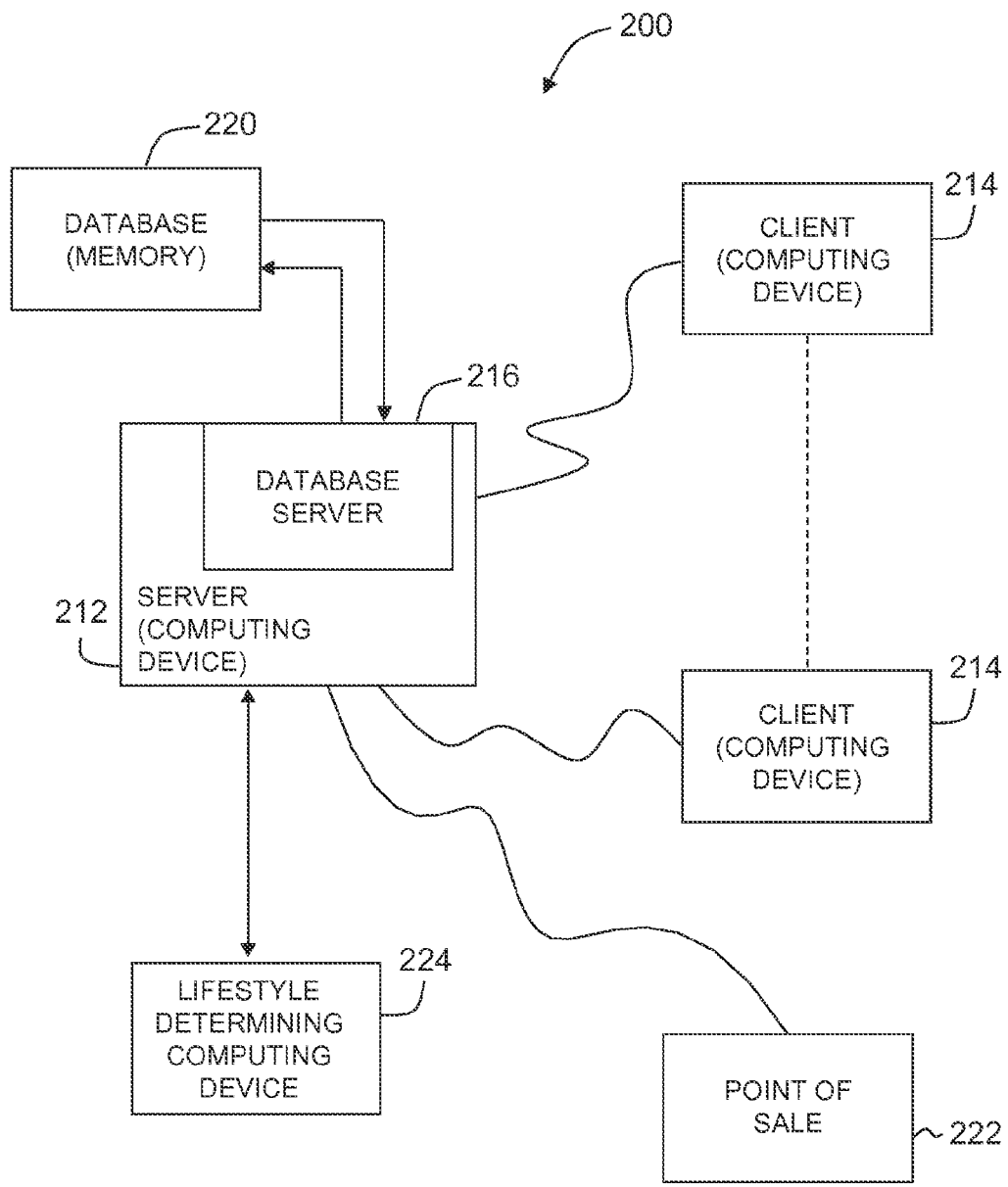

FIG. 2 is a simplified block diagram of an example system 200 used for determining the lifestyle categories of geographic regions in accordance with one example embodiment of the present disclosure. In the example embodiment, system 200 may be used for performing payment-by-card transactions received as part of processing cardholder transactions. In addition, system 200 is a payment processing system that includes a lifestyle determining ("LD") computing device 224 configured to determine the life stage segment of the residents in a geographic region based on cardholder transactions. As described below in more detail, LD computing device 224 is configured to collect transaction information from a plurality of transactions from a plurality of cardholders, determine a life stage segment for multiple cardholders residing in a geographic region, determine a lifestyle category for the geographic region based on the cardholders residing in that geographic region, and generate a report for that geographic region.

In the example embodiment, client systems 214 are computers that include a web browser or a software application, which enables client systems 214 to access server system 212 using the Internet. More specifically, client systems 214 are communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. Client systems 214 can be any device capable of accessing the Internet including, but not limited to, a desktop computer, a laptop computer, a personal digital assistant (PDA), a cellular phone, a smartphone, a tablet, a phablet, or other web-based connectable equipment.

A database server 216 is communicatively coupled to a database 220 that stores data. In one embodiment, database 220 includes transaction information from a plurality of cardholders and paths based on those transactions. In the example embodiment, database 220 is stored remotely from server system 212. In some embodiments, database 220 is decentralized. In the example embodiment, a person can access database 220 via client systems 214 by logging onto server system 212, as described herein.

The LD computing device 224 is communicatively coupled with the server system 212. The LD computing device 224 can access the server system 212 to store and access data and to communicate with the client systems 214 through the server system 212. In some embodiments, the LD computing device 224 may be associated with, or is part of the payment system, or in communication with the payment card system payment network 120, shown in FIG. 1. In other embodiments, the LD computing device 224 is associated with a third party and is merely in communication with the payment network 120.

One or more point of sale systems 222 are communicatively coupled with the server system 212. The one or more point of sale systems 222 can be merchants 124 shown in FIG. 1, where the point of sale systems 222 are communicatively coupled with the server system through the payment network 120. Point of sale systems 222 may be, but are not limited to, machines that accept card swipes, online payment portals, or stored payment card numbers for recurring transactions.

In some embodiments, server system 212 may be associated with a financial transaction interchange network 128 shown in FIG. 1, and may be referred to as an interchange computer system. Server system 212 may be used for processing transaction data and for registering cardholders and/or merchants into a plurality of programs offered by the interchange network, including, but not limited to, a rewards program. In addition, at least one of client systems 214 may include a computer system associated with an issuer of a transaction card. Accordingly, server system 212 and client systems 214 may be utilized to process transaction data relating to purchases a cardholder makes utilizing a transaction card processed by the interchange network and issued by the associated issuer. At least one client system 214 may be associated with a user or a cardholder seeking to register, access information, or process a transaction with at least one of the interchange network, the issuer, or the merchant. In addition, client systems 214 or point of sales devices 222 may include point-of-sale (POS) devices associated with a merchant and used for processing payment transactions. POS devices may be, but are not limited to, machines that accept card swipes, online payment portals, or stored payment card numbers for recurring transactions.

Figure 3:
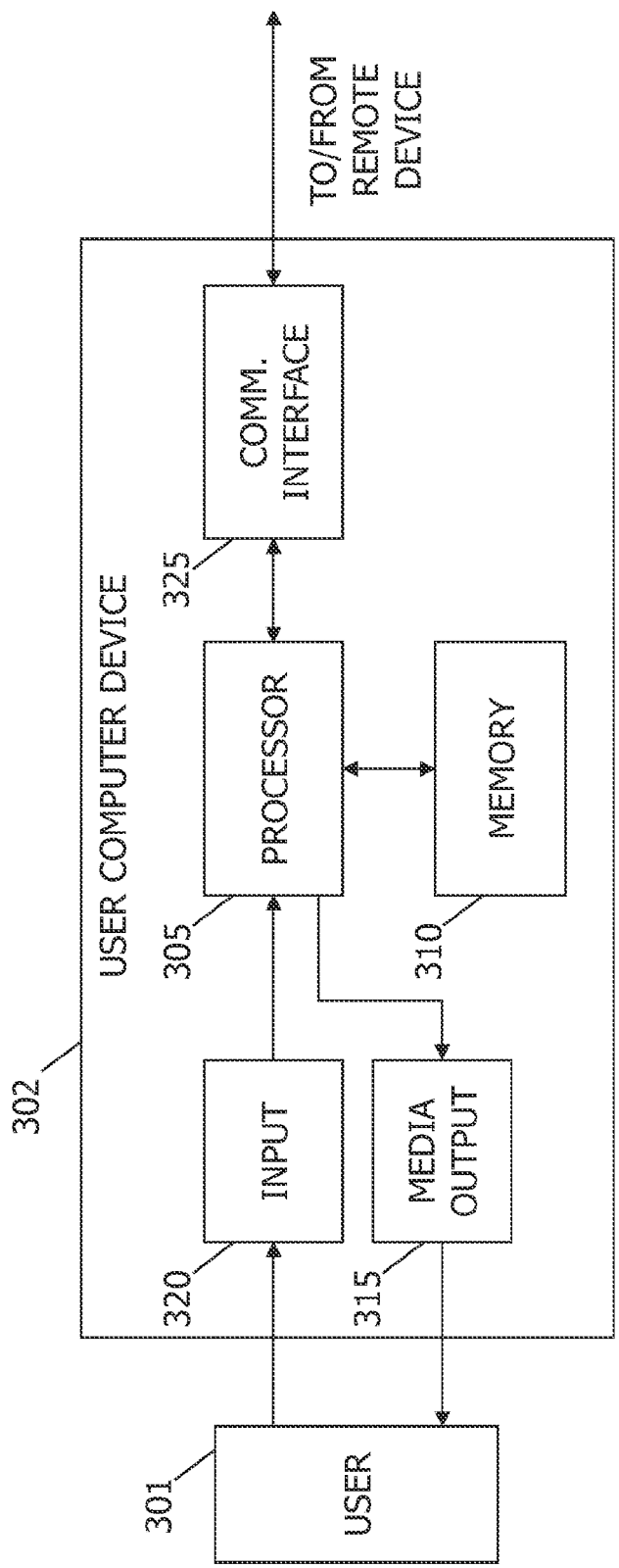

FIG. 3 illustrates an example configuration of a client system 214 shown in FIG. 2, in accordance with one embodiment of the present disclosure. User computer device 302 is operated by a user 301. User computer device 302 may include, but is not limited to, client systems 214 and LD computing device 224 (both shown in FIG. 2). User computer device 302 includes a processor 305 for executing instructions. In some embodiments, executable instructions are stored in a memory area 310. Processor 305 may include one or more processing units (e.g., in a multi-core configuration). Memory area 310 is any device allowing information such as executable instructions and/or transaction data to be stored and retrieved. Memory area 310 may include one or more computer readable media.

User computer device 302 also includes at least one media output component 315 for presenting information to user 301. Media output component 315 is any component capable of conveying information to user 301. In some embodiments, media output component 315 includes an output adapter (not shown) such as a video adapter and/or an audio adapter. An output adapter is operatively coupled to processor 305 and operatively coupleable to an output device such as a display device (e.g., a cathode ray tube (CRT), liquid crystal display (LCD), light emitting diode (LED) display, or "electronic ink" display) or an audio output device (e.g., a speaker or headphones). In some embodiments, media output component 315 is configured to present a graphical user interface (e.g., a web browser and/or a client application) to user 301. A graphical user interface may include, for example, an online store interface for viewing and/or purchasing items, and/or a wallet application for managing payment information. In some embodiments, user computer device 302 includes an input device 320 for receiving input from user 301. User 301 may use input device 320 to, without limitation, select and/or enter one or more items to purchase and/or a purchase request, or to access credential information, and/or payment information. Input device 320 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of media output component 315 and input device 320.

User computer device 302 may also include a communication interface 325, communicatively coupled to a remote device such as server system 212 (shown in FIG. 2). Communication interface 325 may include, for example, a wired or wireless network adapter and/or a wireless data transceiver for use with a mobile telecommunications network.

Stored in memory area 310 are, for example, computer readable instructions for providing a user interface to user 301 via media output component 315 and, optionally, receiving and processing input from input device 320. A user interface may include, among other possibilities, a web browser and/or a client application. Web browsers enable users, such as user 301, to display and interact with media and other information typically embedded on a web page or a website from server system 212. A client application allows user 301 to interact with, for example, server system 212. For example, instructions may be stored by a cloud service, and the output of the execution of the instructions sent to the media output component 315.

Figure 5:
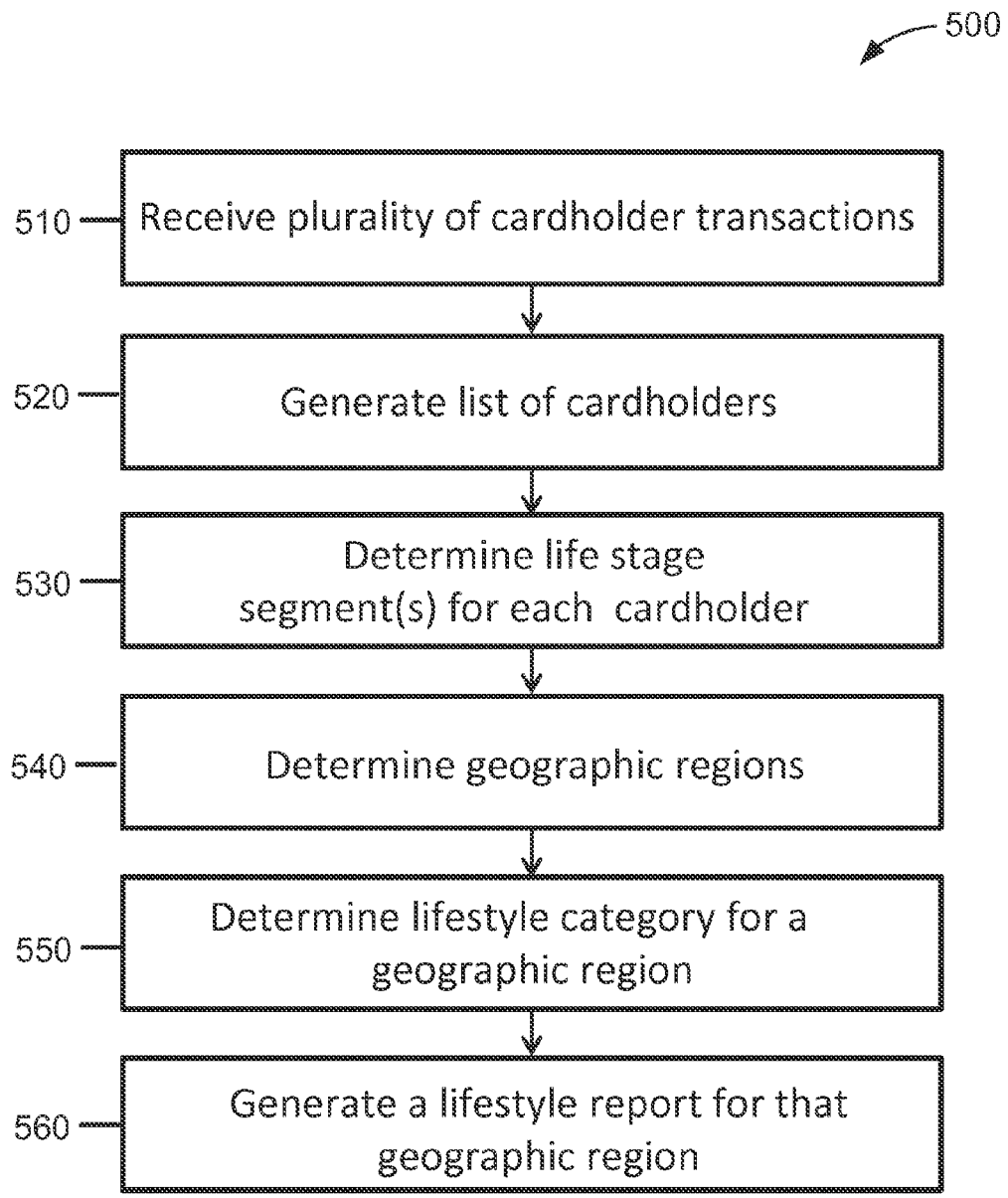
Figure 6:
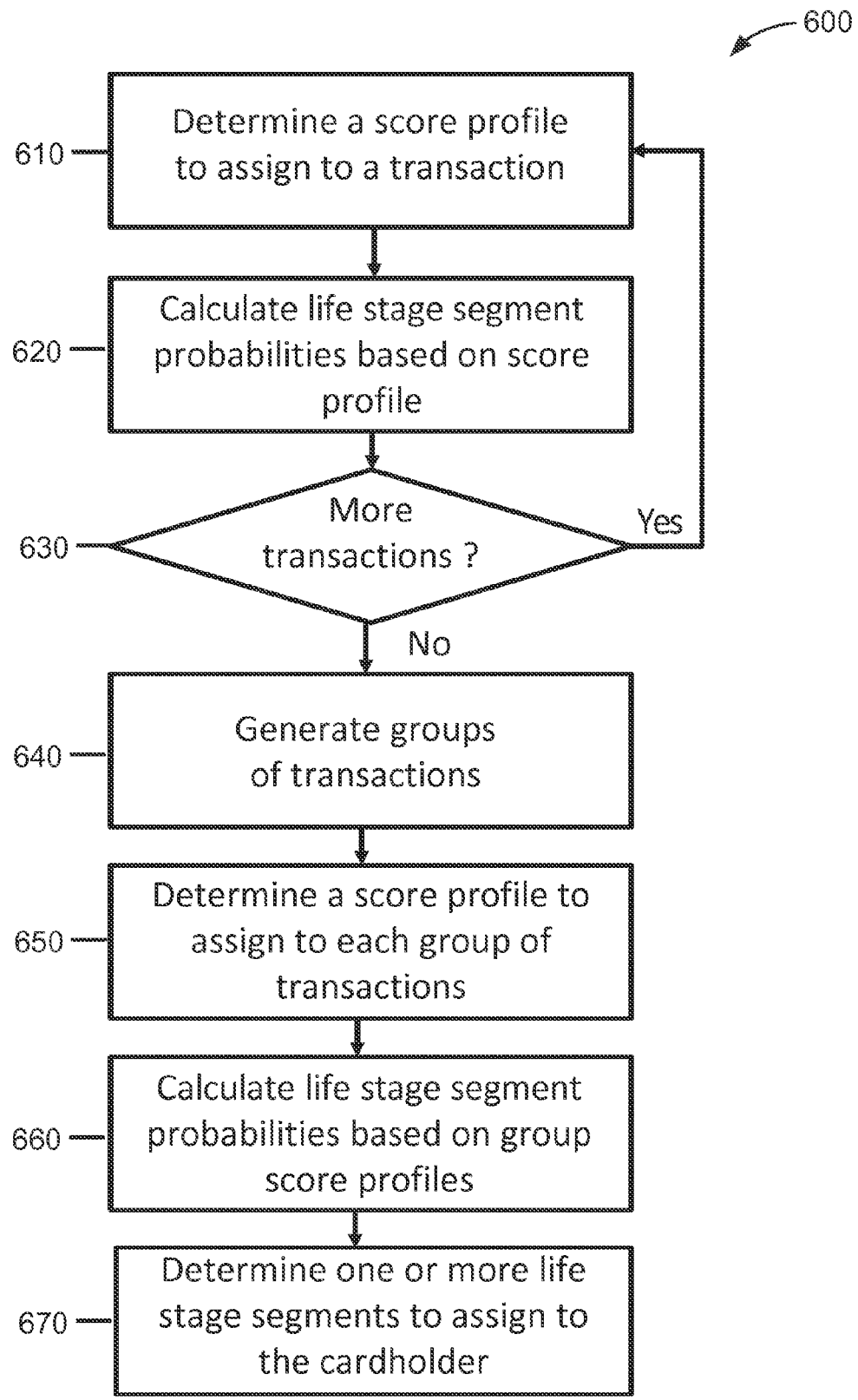

Processor 305 executes computer-executable instructions for implementing aspects of the disclosure. In some embodiments, the processor 305 is transformed into a special purpose microprocessor by executing computer-executable instructions or by otherwise being programmed. For example, the processor 305 is programmed with the instruction such as illustrated in FIGS. 5 & 6.

Figure 4:
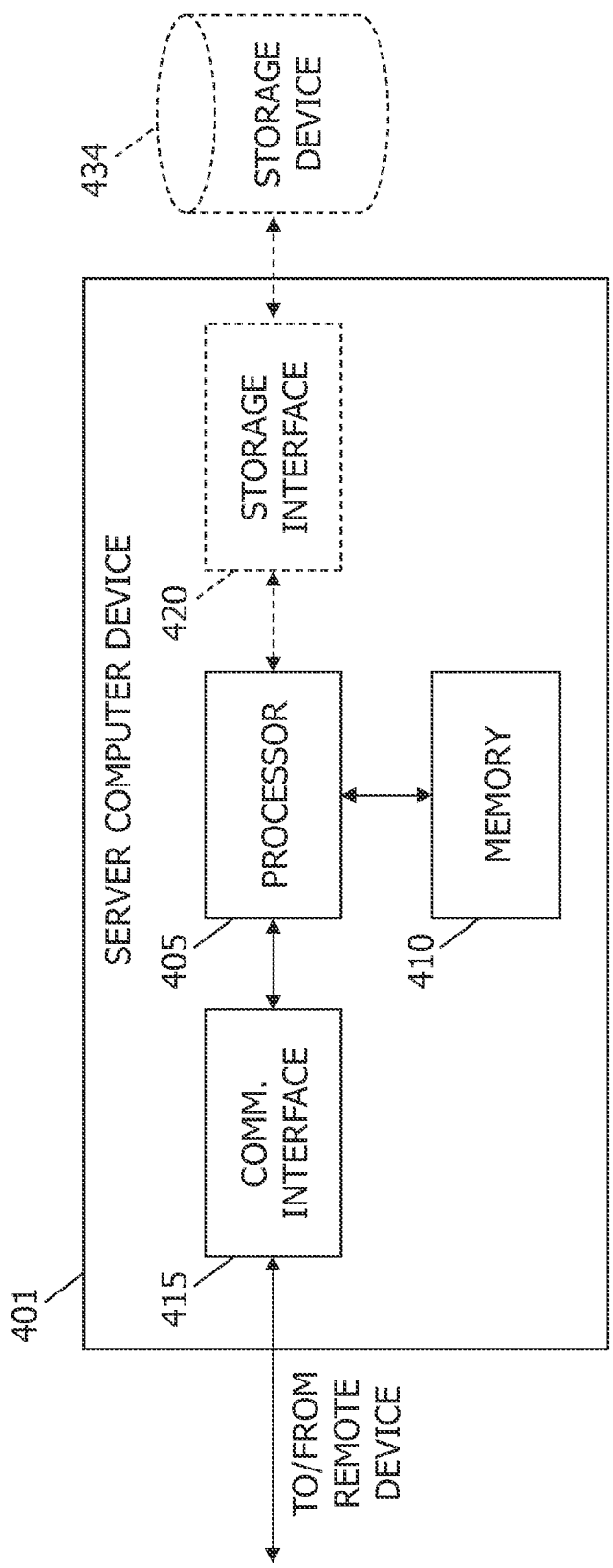

FIG. 4 illustrates an example configuration of the server system 212 shown in FIG. 2, in accordance with one embodiment of the present disclosure. Server computer device 401 may include, but is not limited to, database server 216 (shown in FIG. 2). Server computer device 401 also includes a processor 405 for executing instructions. Instructions may be stored in a memory area 410. Processor 405 may include one or more processing units (e.g., in a multi-core configuration).

Processor 405 is operatively coupled to a communication interface 415 such that server computer device 401 is capable of communicating with a remote device such as another server computer device 401, client systems 214, or LD computing device 224 (both shown in FIG. 2). For example, communication interface 415 may receive requests from client systems 214 via the Internet, as illustrated in FIG. 2.

Processor 405 may also be operatively coupled to a storage device 434. Storage device 434 is any computer-operated hardware suitable for storing and/or retrieving data, such as, but not limited to, data associated with database 220 (shown in FIG. 2). In some embodiments, storage device 434 is integrated in server computer device 401. For example, server computer device 401 may include one or more hard disk drives as storage device 434. In other embodiments, storage device 434 is external to server computer device 401 and may be accessed by a plurality of server computer devices 401. For example, storage device 434 may include a storage area network (SAN), a network attached storage (NAS) system, and/or multiple storage units such as hard disks and/or solid state disks in a redundant array of inexpensive disks (RAID) configuration.

In some embodiments, processor 405 is operatively coupled to storage device 434 via a storage interface 420. Storage interface 420 is any component capable of providing processor 405 with access to storage device 434. Storage interface 420 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 405 with access to storage device 434.

FIG. 5 is a flowchart illustrating an example of the process 500 of determining the lifestyle category of a geographic region from cardholder transaction using the system shown in FIG. 2, in accordance with one embodiment of the disclosure. Process 500 may be implemented by a computing device, for example the LD computing device 224 (shown in FIG. 2). In the example embodiment, the LD computing device 224 receives 510 a plurality of cardholder transactions. The plurality of cardholder transactions may be received from the database server 216, where the cardholder transactions may have been stored in the database 220 (both shown in FIG. 2). In the example embodiment, the plurality of cardholder transactions may include cardholder transactions over a significant period of time, e.g., six months. Each transaction includes at least a unique identifier for each cardholder, a merchant identifier, a merchant category, a geographic location of a merchant, a transaction amount, and a date and time for the transaction.

The LD computing device 224 generates 520 a cardholder list of all of the cardholders that had at least one transaction in the received plurality of cardholder transactions. The LD computing device 224 determines 530 one or more life stage segment(s) for each cardholder. In some embodiments, the LD computing device 224 determines that the cardholder belongs to one life stage segment, such as, but not limited to married with children or empty nester. In other embodiments, the LD computing device 224 determines that the cardholder belongs to multiple life stage segments, such as, but not limited to, singles, recent couples/recently married, new parents, parents with teenagers, and retirement.

The LD computing device 224 determines 540 one or more geographic regions based on the determined cardholder life segments and the received plurality of transactions. A geographic region may be any geographic identifier including, for example and without limitation, a postal code, a city/town/municipality, a neighborhood in a city/town/municipality, GPS coordinates, a county, a single city block, an apartment complex, a street address, and sub-divisions of any of the preceding geographic identifiers.

In some embodiments, one or more geographic regions may be predefined by the user or may be determined by the LD computing device 224. In either case, a minimum number of cardholders in the same life stage segment are required for a defined geographic region to ensure that no personally identifiable information may be obtained from the classification. In the example embodiment, at least three (3) cardholders in a life stage segment are needed to determine a geographic region. If it is determined that there is less than three (3) cardholders in a life stage segment of a geographic region, then the LD computing device 224 or the user must re-define a larger geographic region.

To define a geographic region, the LD computing device 224 identifies a minimum number of cardholders with the same life stage segment living in close proximity. For example, in some places with high population density, e.g., New York City, the LD computing device 224 identifies seven cardholders living in the same apartment building. The LD computing device 224 identifies three of those cardholders to be in the "new parents" life stage segment, three of them in the "retired" life stage segment, and one cardholder in the "singles" life stage segment. Because there is only one cardholder in the "singles" life stage segment, which is below the required minimum number for a geographic region, the LD computing device 224 expands the geographic region until the number of cardholders in each life stage segment with at least one cardholder exceeds the minimum. In the example embodiment, the LD computing device 224 ignores life stage segments with zero cardholders. In the above example the LD computing device 224 expands the proposed geographic region to include a neighboring building which may add two "new parents", one "retired", and three "singles" cardholders. Since no life stage segment with cardholders is below the minimum, the LD computing device 224 defines those two buildings as one geographic region. If the second building had added a single cardholder in a different life stage segment, then the LD computing device 224 would expand the proposed geographic region again. In other places with lower population density, e.g., rural or suburban cardholders may be more spread out and the LD computing device 224 may only be able to find three cardholders of the same life stage segment on a street or a block, rather than an apartment building and define the geographic region to be that street or block.

For each geographic region, the LD computing device 224 determines 550 a lifestyle category for the geographic region based on the life stage segments of the cardholders associated with that geographic region. In some embodiments, the LD computing device may determine a lifestyle category for a geographic region based on the life stage segment with the most cardholders in that geographic region. For example, if a majority or more, such as 7 of the 10 cardholders in a geographic region are in the "new parents" life stage segment, then the LD computing device 224 determines that the geographic region is in the "new parents" lifestyle category. However, there may not be a majority of cardholders in one life stage segment, therefore in other embodiments, the LD computing device may determine a lifestyle category for a geographic region based on percentages (i.e., the lifestyle category is determined based on the life stage segment with the highest percentage of cardholders) or calculated formulas (e.g., if the total number of cardholders with a particular life stage segment exceeds a predetermined threshold). In the example embodiment, the lifestyle categories are the same as the life stage segments, in other embodiments, multiple life stage segments may be combined to determine the lifestyle category. In some embodiments, the lifestyle category is further broken down into sub-categories, such as multiple children and single child. In some embodiments, a minimum number of cardholders must reside in a geographic region to determine a lifestyle category for the geographic region.

The LD computing device 224 generates 560 a lifestyle report for each determined geographic region. In some embodiments, the lifestyle report is a numerical report, showing the numbers of cardholders belonging to different life stage segments, living in the geographic region. In other embodiments, the lifestyle report may graphically represent the lifestyle categories with different colors representing different lifestyle categories in one or more geographic regions. The lifestyle report may be displayed as an overlay of a geographic map. In further embodiments, the lifestyle report includes the different life stage segments of the different cardholders in the geographic region.

FIG. 6 is a flowchart illustrating an example of the process 600 of determining one or more life stage segments for a cardholder using the system shown in FIG. 2, in accordance with one embodiment of the disclosure. Process 600 may be implemented by a computing device, for example the LD computing device 224 (shown in FIG. 2). The LD computing device 224 analyzes a transaction that a cardholder performed and determines 610 a score profile to assign to that transaction. The score profile includes one or more probability values for one or more life stage segments. In the example embodiment, the LD computing device 224 determines the score profile based on the merchant category of the transaction. In some embodiments, merchants have associated scoring profiles based on the merchant category, e.g., the scoring profile for a retail toy store is different than the scoring profile for a high-end men's clothing store. In other embodiments, the scoring profile is associated with an individual store. Based on the scoring profile of the merchant, the LD computing device 224 calculates 620 the cardholder's life stage segment probabilities based on the score profile and any previously calculated life stage segment probabilities. The life stage segment probabilities are a collection of probabilities that the cardholder belongs to one or more life stage segments, where each probability is associated with a life stage segment. For example, if the cardholder makes a purchase from a retail toy store, then the LD computing device 224 increases the probability associated with the cardholder being in the "new parents" and the "parents with teenagers" life stage segments.

The LD computing device 224 checks 630 to see if there are more transactions to analyze for this cardholder. If there are more transactions, then the LD computing device 224 returns to Step 610. If there are no more transactions, then the LD computing device 224 generates 640 one or more groups of transactions. For example, the LD computing device 224 may generate a group of all of the transactions at grocery stores, a group of all of the home improvement store transactions, and a further group of all of the high-end clothing store transactions. For each group of transactions, the LD computing device 224 determines 650 a score profile to assign to the group. For example, the LD computing device 224 analyzes the group of cardholder transactions at home-improvement stores. In the analysis, the LD computing device 224 determines that there are a significant number of moderately-sized transactions during the weekends and assigns the score profile of a new home owner. In another example, the LD computing device 224 determines that there are a significant number of large purchases that primarily occur on weekdays, then the LD computing device 224 assigns the score profile of a contractor.

Once the score profiles are assigned to the groups, the LD computing device 224 calculates 660 the life stage segment probabilities for the cardholder based on the assigned score profiles and any previously calculated life stage segment probabilities. The LD computing device 224 determines 670 one or more life stage segments to assign to the cardholder based on the probabilities. In some embodiments, the LD computing device 224 determines the one or more life stage segments based on the probabilities exceeding predetermined thresholds. In other embodiments, the LD computing device 224 combines multiple probabilities to determine a life stage segment.

Figure 7:
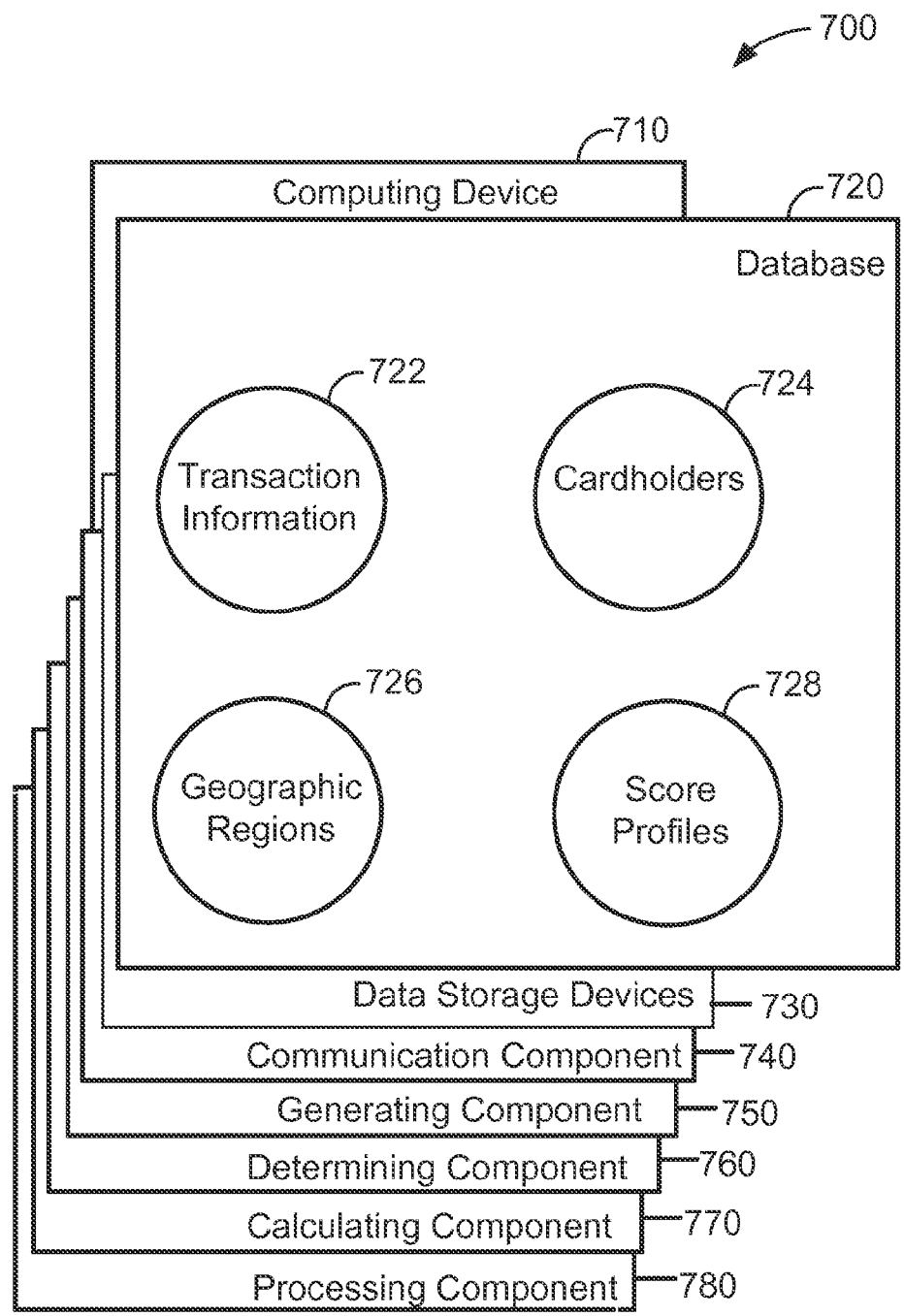

FIG. 7 is a diagram 700 of components of one or more example computing devices that may be used in the system 200 shown in FIG. 2. In some embodiments, computing device 710 is similar to server system 212; it may also be similar to LD computing device 224 (both shown in FIG. 2). Database 720 may be coupled with several separate components within computing device 710, which perform specific tasks. In this embodiment, database 720 includes transaction information 722, cardholders 724, geographic regions 726, and score profiles 728. In some embodiments, database 720 is similar to database 220 (shown in FIG. 2).

Computing device 710 includes the database 720, as well as data storage devices 730. Computing device 710 also includes a communication component 740 for receiving 510 a plurality of cardholder transactions 722, as shown in FIG. 5. Computing device 710 also includes a generating component 750 for generating a list of cardholders 520, generating a lifestyle report 560 (both shown in FIG. 5), and generating groups of transactions 640 (as shown in FIG. 6). A determining component 760 is also included for determining the life stage segment(s) for each cardholder 540, determining one or more geographic regions 726, determining a lifestyle category for a geographic region 550 (all three shown in FIG. 5), determining a score profile 728 to assign to a transaction 610, determining a score profile to assign to each group of transactions 650, and determining one or more life stage segments to assign to a cardholder 670 (all three shown in FIG. 6). A calculating component 770 is also included for calculating the life stage segment probabilities based on a score profile 620 and 660 (as shown in FIG. 6). A processing component 780 assists with execution of computer-executable instructions associated with the system.

The systems and processes are not limited to the specific embodiments described herein. In addition, components of each system and each process can be practiced independent and separate from other components and processes described herein. Each component and process also can be used in combination with other assembly packages and processes.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

While the disclosure has been described in terms of various specific embodiments, those skilled in the art will recognize that the disclosure can be practiced with modification within the spirit and scope of the claims.

As will be appreciated based on the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. Example computer-readable media may be, but are not limited to, a flash memory drive, digital versatile disc (DVD), compact disc (CD), fixed (hard) drive, diskette, optical disk, magnetic tape, semiconductor memory such as read-only memory (ROM), and/or any transmitting/receiving medium such as the Internet or other communication network or link. By way of example and not limitation, computer-readable media comprise computer-readable storage media and communication media. Computer-readable storage media are tangible and non-transitory and store information such as computer-readable instructions, data structures, program modules, and other data. Communication media, in contrast, typically embody computer-readable instructions, data structures, program modules, or other data in a transitory modulated signal such as a carrier wave or other transport mechanism and include any information delivery media. Combinations of any of the above are also included in the scope of computer-readable media. The article of manufacture containing the computer code may be made and/or used by executing the code directly from one medium, by copying the code from one medium to another medium, or by transmitting the code over a network.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A computer implemented method for categorizing neighborhoods based on cardholder transactions, said method using a computing device having a processor communicatively coupled to a memory, said method comprising:
receiving, by the processor, a plurality of payment transactions from a plurality of cardholders;

generating, by the processor, a list of cardholders based on the plurality of payment transactions;

determining, by the processor, one or more life stage segments for each cardholder of the list of cardholders based on the plurality of payment transactions;

determining, by the processor, a geographic region containing a plurality of cardholders from the list of cardholders based in part on the one or more life stage segments associated with each of the plurality of cardholders contained within the geographic region;

determining, by the processor, a lifestyle category for the geographic region based on the one or more life stage segments of each of the cardholders associated with the geographic region; and providing, by the processor, a lifestyle report for the geographic region.

2. The method in accordance with claim 1, wherein determining one or more life stage segments for each cardholder further comprises:

determining, by the processor, a score profile to assign to each payment transaction of the plurality of payment transactions associated with a cardholder;

calculating, by the processor, one or more life stage segment probabilities based on the assigned score profiles; and determining, by the processor, one or more life stage segments for the cardholder based on the calculated one or more life stage segment probabilities.

3. The method in accordance with claim 2, further comprising:

generating groups of payment transactions based on the payment transactions associated with the cardholder;

determining, by the processor, a score profile to assign to each group of payment transactions; and recalculating, by the processor, the one or more life stage segment probabilities based on the assigned score profiles and the calculated one or more life stage segment probabilities.

4. The method in accordance with claim 3, wherein generating groups of payment transactions is based on the merchant category of the payment transactions in the group of payment transactions.

5. The method in accordance with claim 2, wherein determining a score profile is based on a merchant category associated with the payment transaction.

6. The method in accordance with claim 1, wherein determining a lifestyle category further comprises:

compiling, by the processor, a total number for each life stage segment associated with the plurality of cardholders associated with the geographic region;

determining, by the processor, that the total number for at least one life stage segment exceeds a predetermined threshold; and determining, by the processor, a lifestyle category for the geographic region for each life stage segment that exceeded the associated predetermined threshold.

7. The method in accordance with claim 1, wherein determining a lifestyle category further comprises:

compiling, by the processor, a total number for each life stage segment associated with the plurality of cardholders associated with the geographic region;

determining, by the processor, a lifestyle category for the geographic region based on the life stage segment with the greatest total number compared to the other total numbers of life stage segments.

8. The method in accordance with claim 1, wherein determining a geographic region further comprises:

determining, by the processor, a proposed geographic region, where the proposed geographic region includes a plurality of cardholders to exceed a first predetermined threshold;

determining, by the processor, the one or more life stage segments associated with each of the plurality of cardholders in the proposed geographic region;

determining, by the processor, that a number of cardholders associated with a particular life stage segment exceeds a second predetermined threshold, where the determination is made for each life stage segment with at least one associated cardholder in the proposed geographic region; and identifying the proposed geographic region as a geographic region.

9. The method in accordance with claim 1, wherein determining a geographic region further comprises:

determining, by the processor, a proposed geographic region, where the proposed geographic region includes a plurality of cardholders to exceed a first predetermined threshold;

determining, by the processor, the one or more life stage segments associated with each of the plurality of cardholders in the proposed geographic region;

determining, by the processor, that a number of cardholders associated with a particular life stage segment exceeds a second predetermined threshold, where the determination is made for each life stage segment with at least one associated cardholder in the proposed geographic region;

expanding, by the processor, the proposed geographic region until the number of cardholders for each life stage segment with at least one associated cardholder in the proposed geographic region exceeds the second predetermined threshold; and assigning the proposed geographic region as a geographic region.

10. A computer system for categorizing neighborhoods based on cardholder transactions, said computer system comprising:

a memory device for storing data; and one or more processors in communication with said memory device, said one or more processors programmed to:

receive a plurality of payment transactions from a plurality of cardholders;

generate a list of cardholders based on the plurality of payment transactions;

determine one or more life stage segments for each cardholder of the list of cardholders based on the plurality of payment transactions;

determine a geographic region containing a plurality of cardholders from the list of cardholders based in part on the one or more life stage segments associated with each of the plurality of cardholders contained within the geographic region;

determine a lifestyle category for the geographic region based on the one or more life stage segments of each of the cardholders associated with the geographic region; and provide a lifestyle report for the geographic region.

11. The system in accordance with claim 10, wherein said processor is further programmed to:

determine a score profile to assign to each payment transaction of the plurality of payment transactions associated with a cardholder;

calculate one or more life stage segment probabilities based on the assigned score profiles; and determine one or more life stage segments for the cardholder based on the calculated one or more life stage segment probabilities.

12. The system in accordance with claim 11, wherein said processor is further programmed to determine a score profile based on a merchant category associated with the payment transaction.

13. The system in accordance with claim 10, wherein said processor is further programmed to:

generate groups of payment transactions based on the payment transactions associated with the cardholder;

determine a score profile to assign to each group of payment transactions; and recalculate the one or more life stage segment probabilities based on the assigned score profiles and the calculated one or more life stage segment probabilities.

14. The system in accordance with claim 13, wherein said processor is further programmed to generate groups of payment transactions based on the merchant category of the payment transactions in the group of payment transactions.

15. The system in accordance with claim 10, wherein said processor is further programmed to:

compile a total number for each life stage segment associated with the plurality of cardholders associated with the geographic region;

determine that the total number for at least one life stage segment exceeds a predetermined threshold; and determine a lifestyle category for the geographic region for each life stage segment that exceeded the associated predetermined threshold.

16. The system in accordance with claim 10, wherein said processor is further programmed to:

compile a total number for each life stage segment associated with the plurality of cardholders associated with the geographic region;

determine a lifestyle category for the geographic region based on the life stage segment with the greatest total number compared to the other total numbers of life stage segments.

17. A non-transitory computer-readable storage medium having computer-executable instructions embodied thereon, wherein when executed by a computing device having at least one processor coupled to a memory device, the computer-executable instructions cause the processor to:

receive a plurality of payment transactions from a plurality of cardholders;

generate a list of cardholders based on the plurality of payment transactions;

determine one or more life stage segments for each cardholder of the list of cardholders based on the plurality of payment transactions;

determine a geographic region containing a plurality of cardholders from the list of cardholders based in part on the one or more life stage segments associated with each of the plurality of cardholders contained within the geographic region;

determine a lifestyle category for the geographic region based on the one or more life stage segments of each of the cardholders associated with the geographic region; and provide a lifestyle report for the geographic region.

18. The non-transitory computer-readable storage medium of claim 17, wherein the computer-executable instructions further cause the processor to:

determine a score profile to assign to each payment transaction of the plurality of payment transactions associated with a cardholder;

calculate one or more life stage segment probabilities based on the assigned score profiles; and determine one or more life stage segments for the cardholder based on the calculated one or more life stage segment probabilities.

19. The non-transitory computer-readable storage medium of claim 17, wherein the computer-executable instructions further cause the processor to:

generate groups of payment transactions based on the payment transactions associated with the cardholder;

determine a score profile to assign to each group of payment transactions; and recalculate the one or more life stage segment probabilities based on the assigned score profiles and the calculated one or more life stage segment probabilities.

20. The non-transitory computer-readable storage medium of claim 17, wherein the computer-executable instructions further cause the processor to:

compile a total number for each life stage segment associated with the plurality of cardholders associated with the geographic region;

determine that the total number for a particular life stage segment exceeds a predetermined threshold; and determine a lifestyle category for the geographic region for each life stage segment that exceeded the associated predetermined threshold.

\* \* \* \* \*